Patented Oct. 8, 1935

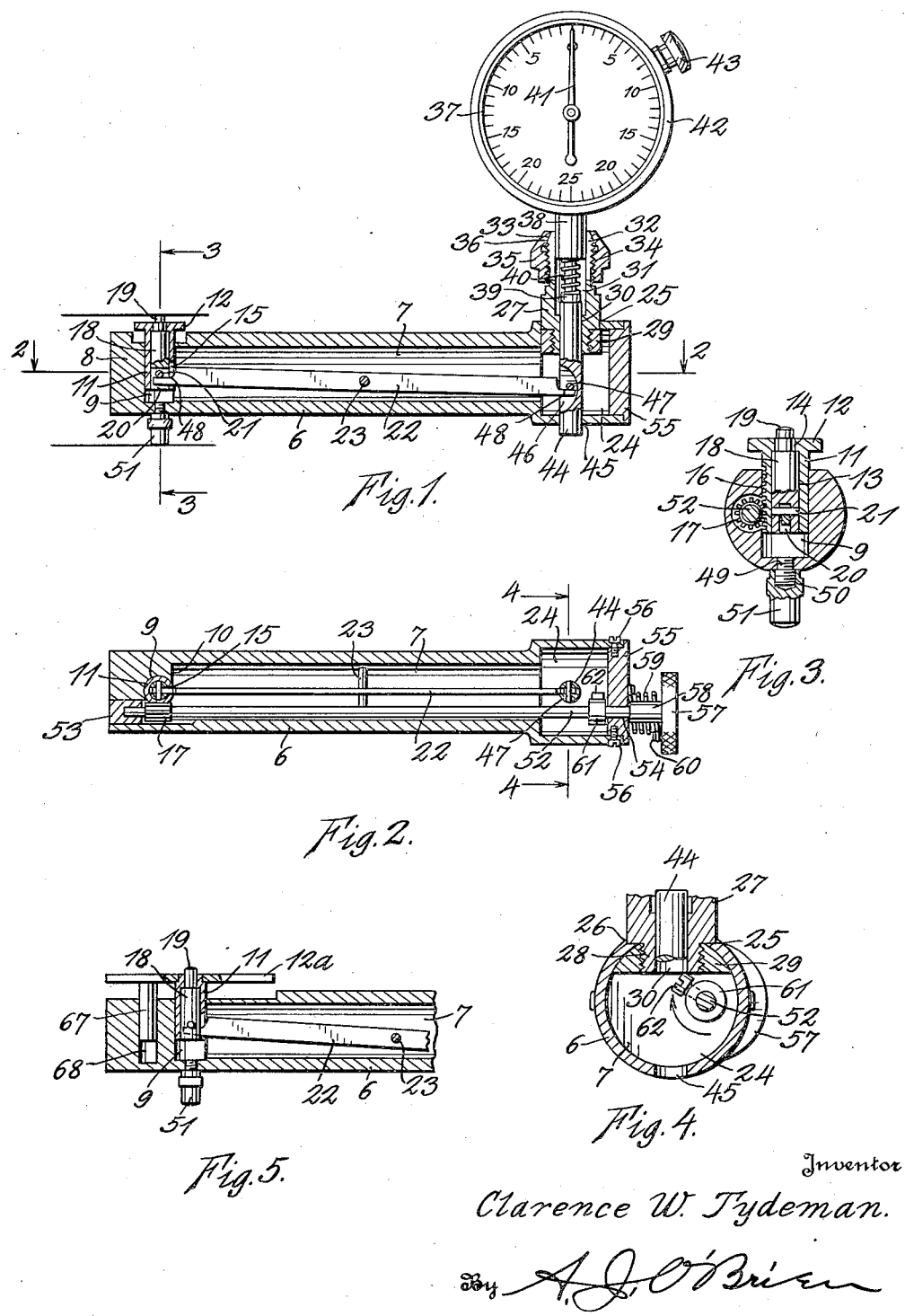

2,016,659

UNITED STATES PATENT OFFICE 2,016,659

INTERNAL CALIPER GAUGE

Clarence W. Tydeman, Englewood, Colo.

Application November 9, 1931, Serial No. 573,764

15 Claims. (Cl. 33—178)

This invention relates to improvements in precision measuring instruments and has reference more particularly to an attachment for use with dial indicators for the purpose of measuring and testing the diameters of cylindrical openings.

In machine construction it is often necessary to be able to quickly and accurately test the diameters of openings and to test the openings for the purpose of determining whether they are of the same diameter at all points.

It is the object of this invention to produce a simple and substantial attachment that can be quickly connected with an ordinary dial indicator and which shall be especially well adapted for measuring or calipering the diameters of openings of comparatively small size, such, for example, as openings having a diameter of 1⅛ to 1½ inches. The above limits are mentioned merely as examples as it is possible to make the instrument of such size that it can be used with smaller, as well as with larger openings than those indicated.

Another object of this invention is to produce a device of the type referred to which shall be provided with means accesible at all times for retracting the contact points so as to facilitate the insertion and the removal of the instrument from the opening. A still further object of this invention is to produce a device of the type indicated in which the locating or squaring means shall be on the same side as the movable contact point, and in which both the contact point and the locating device can be simultaneously retracted.

The above and other objects that may become apparent as the description proceeds are attained by means of a construction and an arrangement of parts that will now be described in detail, and for this purpose reference will be had to the accompanying drawing in which the preferred embodiment of the invention has been illustrated, and in which:

Fig. 1 is a longitudinal diametrical section through the attachment showing the dial indicator secured thereto;

Fig. 2 is a section taken on line 2—2, Fig. 1;

Fig. 3 is a transverse section taken on line 3—3, Fig. 1;

Fig. 4 is a transverse section taken on line 4—4, Fig. 2; and

Fig. 5 is a section similar to that shown in Fig. 1 and shows a slightly modified construction.

In the drawing reference numeral 6 indicates the elongated tubular body member which is preferably cylindrical, although this is not absolutely necessary. Member 6 is provided with a central opening 7 that extends inwardly from one end thereof and has the other end closed as indicated by reference numeral 8. The end 8 is provided with a diametrical opening 9 that extends inwardly from one side and terminates a short distance from the outer surface of the device. The opening 7 has a square bottom as indicated by reference numeral 10 and the plane of this bottom intersects the opening 9 so as to form an elongated opening in line with a diametrical plane. Mounted for reciprocation in opening 9, is a tubular plug 11. This plug in the embodiment shown in Fig. 1 has a circular head 12 and is provided with an axial opening 13 which terminates in an opening 14 of somewhat smaller diameter. The wall of plug 11 is provided on one side with a slot 15 and at right angles to this slot a number of gear teeth 16 are provided. These gear teeth form a rack with which a small pinion 17 cooperates. Located within the opening 13 is a contact member 18. This contact member has a contact point 19 that extends outwardly beyond the outer surface of the head 12. The lower end of plug 18 has a diametrical slot 20 and extending through this slot near the upper end thereof is a pin 21. A lever 22 extends through the opening 7 and is pivoted at its center point by means of a pin 23. The other end of member 6 has an enlarged opening 24 that is a continuation of opening 7 and concentric therewith. The wall surrounding the opening 24 is provided with an opening 25 whose axis is parallel to the axis of opening 11 and which is so constructed that the side of the opening forms an upwardly extending flange 26 on two opposite sides in the manner shown in Fig. 4. Located in the opening 25 is a plug 27. This plug has a threaded projection 28 that cooperates with the threads on a nut 29. By rotating the plug 27, it will be clamped to the member 6 by the action of the nut in a manner quite apparent in Figs. 1 and 4. Plug 27 is provided with an axial opening 30 that extends through the threaded plug and whose upper end is enlarged so as to provide a cylindrical section 31 of somewhat larger diameter. The upper end of plug 27 is provided with fingers 32, whose upper ends are inclined on their outer surfaces as indicated by numeral 33. These fingers are provided with threads 34 with which a cap 35 cooperates. The upper end of this cap has an inwardly inclined surface 36 that is adapted to be brought into contact with the inclined walls 33 of the fingers. A dial indicator 37, which is provided with a cylindrical stem 38, is secured to the member 6 by the clamping action of the fingers. The cylindrical portion 38 is inserted in the opening between the fingers and pushed downwardly as far as it should go, after which the nut 35 is rotated, whereby the dial indicator is clamped in position. The dial indicator is provided with a movable plug 39 that is acted upon by a spring 40 which tends to move it downwardly. The pin 39 is connected to the pointer 41 by means of gears or other suitable mechanism so that whenever this pin is moved with respect to the stem 38, the pointer 41 will turn about its pivot. A bezel 42 is secured to the indicator and this is rotatable and can be clamped in position by means of a screw 43. A pin 44 extends through the opening in plug 27 and also through an opening 45 in the wall surrounding the cylindrical section 24. One side of this pin has a crescent-shape slot 46 milled therein and extending through this slot is a pin 47. The ends of lever 22 are cut away as indicated by reference numerals 48 and these cutaway portions extend underneath the pins 21 and 47. When the indicator is in place spring 40 exerts a force tending to move the pin 44 downwardly and this, in turn, acts through the pin 47 and moves the lever 22 about its pivot, thereby moving the contact 19 outwardly. Whenever the contact 19 is moved inwardly, this motion is transmitted through the lever 22 to the pin 44 and this in turn moves the pin 39 outwardly and turns the pointer 41 about its pivot. If the distance from the center of pin 21 to the pivot 23 is the same as the distance from center of pin 47 to the pivot 23, the contact point 19 will move at the same rate as the pin 44 and if the indicator is graduated in one thousandths of an inch, then whenever the pointer 41 moves one division on the scale, it indicates a movement of one one thousandth of an inch by the contact point 19. Located at a point diametrical opposite from point 19 is another contact point which has been indicated by reference numeral 49. The outer end of this plug is threaded as indicated by reference numeral 50. For measuring the smallest diameter openings, the end of the threaded contact point is used, but whenever larger openings are to be measured, extensions like that indicated by reference numeral 51 can be secured to the plug 49 and by having a number of these extensions, it is possible to measure openings of widely different diameters.

I want to call attention at this point to the fact that the threaded contact point 49 to which the extensions 51 are secured is stationary with respect to the body member 6 and therefore the movable parts are not subjected to strains when the extension is applied or removed, as would be the case if these extensions were applied to the movable contact point 19. Another advantage of this construction is this, that by applying the extensions to the stationary contact point, it is possible to have the locating or squaring means, which has been designated by reference numeral 12, on the same side as the movable contact point.

In the foregoing parts of this description, reference was made to the pinion 17. This pinion is secured to the inner end of a rod 52. This rod is pivoted in a bearing 53 that is located adjacent the tubular plug 11, and the other end is journaled in an opening 54 in the end closure 55. This end closure is held in place by means of screws 56. The outer end of rod 52 is provided with a knurled disk 57 that has a hub 58. The hub may have a threaded connection with the end of the rod. A spring 59 has one end connected with the end closure and the other connected to the knob 57 as indicated by reference numeral 60. Spring 59 is so tensioned that it will rotate rod 52 and pinion 17 in such a direction that the locating device will be moved outwardly. A collar 61 is secured to the rod 52 and located adjacent the inner surface of the end closure. This collar has a screw 62 that serves as a stop by engaging the inner surface of the threaded portion of plug 27 in the manner shown in Fig. 4.

It will be seen from an inspection of Fig. 1 that the contact plug 18 has a shoulder that engages the shoulder between the different diameter openings in the locating means and therefore whenever the rod 52 is rotated against the tension of the spring, it will move the locating element inwardly and simultaneously therewith move the contact point 19 inwardly and in this way the parts are collapsed so as to facilitate the introduction of the device into the opening to be tested and its removal from the opening. The diameter of the head 12 is such that its diametrically opposite edges will rest on the inner surface of the opening to be measured and form with the inner cylindrical surface a chord. The movable plug 18 extends through the center of the head 12 and at right angles to the points that contact with the inner surface of the opening and therefore its axis forms a perpendicular bisector of the chord and passes through the center of the opening to be measured. When the head 12 is round, as shown in Figs. 1 and 3, it serves the purpose of locating the measuring points in line with the diameter, but does not prevent the instrument from being tilted along its longitudinal axis and therefore in order to get an exact measurement the instrument must be held in such a position that the axis of the measuring contact is perpendicular to the axis of the opening to be measured. By tilting this device so as to get the smallest reading, this position can be readily obtained.

In Fig. 5 a slightly modified form has been shown. In this modification the head 12 has been replaced by a rectangular steel plate 12a. The opposite sides of this plate are parallel and the width of the plate is substantially the same as the diameter of the head 12. Plate 12a is secured to the outer end of member 11 in any suitable way, as, for example, by brazing or welding. To prevent the plate 12a from turning and from subjecting the rack to severe strains, it has been provided with a pin 67 that is slidable in an opening 68. It will be observed from Fig. 5 that the contact point 19 extends through the locating plate 12a in the same manner as it extends through the head 12 in Fig. 3. Since plate 12a is connected and has parallel sides and since it is urged outwardly against the surface of the opening by the action of spring 59, it tends not only to so position the parts that the contacts extend across the diameter, but also locates the contacts in a plane perpendicular to the axis of the opening to be measured.

I want to call attention to some of the features of the construction which I believe are of great importance in a device of this type. One of these is that by having the movable contact extending through the locating device, it is possible to secure the extensions 51 to a stationary contact, thereby avoiding the production of strains due to applying and removing these extensions. By having means for simultaneously retracting the locating device and the contact point, the instrument can be inserted and removed from openings without subjecting the parts to strains as now very often happens. I also want to call attention to the fact that this device is in the form of an attachment that can be used with indicators of this type, but which can readily be removed from the indicator so that it can be employed for other purposes, thereby making it unnecessary to monopolize the use of an indicator and also make it possible to substitute indicators of different calibration whenever occasion requires.

Having described the invention what is claimed as new is:

1. A device for measuring the diameter of a cylindrical opening comprising, in combination, an elongated body member adapted to be inserted into the opening, an indicator secured to the body member, two aligned contacts for making engagement with the opening wall at diametrically opposed points, one of the contacts being removably secured to the body member and normally stationary with respect thereto, the other contact being movable transversely of the body member, a centering plate movably connected with the body member, said plate having an opening through which the movable contact passes, a spring means associated with the centering plate for urging it outwardly, another spring means associated with the movable contact for moving it outwardly, means for transmitting motion from the movable contact to the indicator, and means for simultaneously retracting the centering plate and the movable contact to facilitate the insertion and the removal of the measuring device into and from the opening.

2. A device for measuring the diameter of a cylindrical opening, comprising, in combination, an elongated body member adapted to be inserted into the opening, an indicator secured to one end of the body member, two aligned contacts for making engagement with the opening wall at diametrically opposed points, one of the contacts being stationary and the other movable with respect to the body member, resilient means for urging the movable contact outwardly, means for transmitting motion from the movable contact to the indicator, a centering plate secured to the body member and provided with an opening through which the movable contact passes, means comprising a spring for urging the centering plate outwardly, and means for simultaneously moving the centering plate and the movable contact inwardly to facilitate the inserting and removal of the gauge into and from an opening.

3. A device for measuring the diameter of cylindrical openings comprising, in combination, an elongated body member adapted to be inserted into the opening, a dial indicator provided with a pointer and secured to one end of the body member, two aligned contacts for making engagement with the opening wall at diametrically opposed points, one of the contacts being stationary and the other movable, means for transmitting motion from the movable contact to the pointer of the indicator, means comprising a plate having parallel edges for locating the contacts with respect to the opening so that their common axis coincides with a diameter lying in a plane perpendicular to the axis of the opening and means for simultaneously retracting the locating means and the movable contact when the body member is inserted or removed from an opening.

4. A device for measuring the diameter of a cylindrical opening by means of an indicator, comprising, in combination, an elongated body member whose maximum outside dimension adjacent one end is less than the smallest diameter of the opening to be measured, whereby this end of the body member can be inserted into the opening, means near the outer end of the body member for securing an indicator in place thereon, the inner end having two aligned transversely extending contact members, one of which is movable with respect to the body member and the other contact, means movably secured to the body member on the same side thereof as the movable contact for locating the contact points in a diametrical plane containing the axis of the opening, said locating means having an opening through which the movable contact passes, means interposed between the movable contact and the indicator for operating the latter as the distance between the outer ends of the contact members is varied, and means accessible from the outside of the opening for moving the locating means and the movable contact inwardly to facilitate the insertion and the removal of the device.

5. A device for measuring the diameter of a cylindrical opening by means of an indicator, comprising, in combination, an elongated body member whose maximum outside dimension adjacent one end is less than the smallest diameter of the opening to be measured, whereby this end of the body member can be inserted into the opening, means near the other end of the body member for securing an indicator in place thereon, the inner end having two transversely extending aligned contact members, one of which is movable with respect to the body member and with respect to the other contact, means movably secured to the body member on the same side thereof as the movable contact for locating the contact points in a diametrical plane containing the axis of the opening, said locating means having an opening through which the movable contact passes, means interposed between the movable contact and the indicator for operating the latter as the distance between the outer ends of the contact members is varied, a resilient means associated with the movable contact and another associated with the locating means for independently urging them outwardly against the wall of the opening, and means accessible from the outside of the opening for moving the locating means and the movable contact inwardly to facilitate the insertion and the removal of the device.

6. A device for measuring the diameter of a cylindrical opening by means of an indicator, comprising, in combination, an elongated body member whose maximum outside dimension adjacent one end is less than the smallest diameter of the opening to be measured, whereby one end of the body member can be inserted into the opening, means near the outer end of the body member for securing an indicator in place thereon, the inner end having two transversely extending aligned contact members, one of which is movable with respect to the body member and with respect to the other contact, means movably secured to the body member on the same side thereof as the movable contact for locating the contact points in a diametrical plane which includes the axis of the opening and with their common axis at right angles to said axis, said locating means having an opening through which the movable contact passes, means interposed between the movable contact and the indicator for operating the latter as the distance between the outer ends of the contact members is varied and means accessible from the outside of the opening for simultaneously moving the locating means and the movable contact inwardly to facilitate the insertion and the removal of the device.

7. A device for measuring the diameter of a cylindrical opening comprising, in combination, an elongated body member having one end so dimensioned that it can be inserted into the opening to be measured, the other end having means for detachably securing an indicator thereto, the end opposite from the indicator securing means having two transversely extending aligned contact members, one of which is movable with respect to the other and with respect to the body member, means for transmitting motion from the movable contact to the indicator, means carried by the body member for locating the same in a cylindrical opening in such a position that the common axis of the contact members will pass through the central axis of the opening, said positioning means having an opening through which the movable contact passes, two resilient means, one associated with the movable contact and the other with the locating means for independently urging them outwardly against the wall of the opening, and means for moving the locating means and the movable contact towards the body member to facilitate the insertion of the device into and its removal from the opening.

8. A device for measuring the diameter of a cylindrical opening comprising, in combination, an elongated body member having one end so dimensioned that it can be inserted into the opening to be measured, the other end having means for detachably securing an indicator thereto, two aligned contact members secured to the end of the body member opposite from the indicator, one of the contacts being movable with respect to the other and with respect to the body member, means for transmitting motion from the movable contact to the indicator, means carried by the body member for locating the same in a cylindrical opening in such a position that the common axis of the contact members will pass through the central axis of the opening, said positioning means having an opening through which the movable contact passes, a resilient means associated with the movable contact and another with the locating means for independently urging them outwardly against the wall of the opening, and means located adjacent the dial securing means for simultaneously moving the locating means and the contact member towards the body member to facilitate the insertion and the removal of the device.

9. A device for measuring the diameter of a cylindrical opening comprising, an elongated tubular body member, means on one end of the said member for securing a dial indicator having a pointer in place thereon, a tubular locating device connected with the other end of the body member and longitudinally movable in a transversely extending opening, the outer surface of the locating device having a plurality of teeth forming a rack, a rod extending inwardly from the end with which the securing means is associated and mounted for rotation, the inner end of the rod having a pinion which engages the rack teeth whereby when the rod is turned the locating device will be moved in the direction of its length, means comprising a spring for urging the locating device outwardly, a stop for limiting the outward movement, a contact member located within the tubular locating device and normally projecting beyond the same, resilient means for urging the contact member outwardly, and means for transmitting motion from the contact member to the pointer of the indicator.

10. A device for measuring the diameter of a cylindrical opening comprising, an elongated tubular body member, means on one end of the said member for securing a dial indicator having a pointer in place thereon, a tubular locating device connected with the other end of the body member and longitudinally movable in a transversely extending opening, the outer surface of the locating device having a plurality of teeth forming a rack, a rod extending inwardly from the end with which the securing means is associated and mounted for rotation, the inner end of the rod having a pinion which engages the rack teeth whereby when the rod is turned the locating device will be moved in the direction of its length, means comprising a spring for urging the locating device outwardly, a stop for limiting the outward movement, a contact member located within the tubular locating device and normally projecting beyond the same, resilient means for urging the contact member outwardly, and means for transmitting motion from the contact member to the pointer of the indicator, said last named means comprising a lever pivoted intermediate its ends, one end being in contact with a part of the movable contact member and the other contacting with a device for moving the pointer on the indicator.

11. A device for measuring the diameter of a cylindrical opening comprising, an elongated tubular body member, means on one end of the said member for securing a dial indicator having a pointer in place thereon, a tubular locating device connected with the other end of the body member and longitudinally movable in a transversely extending opening, the outer surface of the locating device having a plurality of teeth forming a rack, an elongated plate secured to the outer end of the tubular locating device, said plate having its longitudinally extending sides parallel, means for holding the plate in position with its sides parallel with the axis of the tubular body member, a rod extending inwardly from the end with which the securing means is associated and mounted for rotation, the inner end of the rod having a pinion which engages the rack teeth whereby when the rod is turned the locating device will be moved in the direction of its length, means comprising a spring for urging the locating device outwardly, a stop for limiting the outward movement, a contact member located within the tubular locating device and normally projecting beyond the same, resilient means for urging the contact member outwardly, and means for transmitting motion from the contact member to the pointer of the indicator, said last named means comprising a lever pivoted intermediate its ends, one end being in contact with a part of the movable contact member and the other contacting with a device for moving the pointer on the indicator.

12. A device for measuring the diameter of a cylindrical opening comprising, in combination, an elongated body member adapted to be inserted into the opening, an indicator secured to the body member, two aligned contacts for making engagement with the opening wall at diametrically opposed points, one of the contacts being normally stationary with respect to the body member, the other contact being movable transversely of the body member, a centering plate movably connected with the body member, said plate having an opening through which the movable contact passes, a spring means associated with the centering plate for urging it outwardly, a spring means associated with the movable contact for moving it outwardly, means for transmitting motion from the movable contact to the indicator, and means for moving the centering plate and the movable contact towards the body member to facilitate the insertion of the device into an opening.

13. A device for measuring the diameter of a cylindrical opening comprising, in combination, an elongated body member adapted to be inserted into the opening, an indicator secured to the body member, two aligned contacts for making engagement with the opening wall at diametrically opposed points, one of the contacts being removably secured to the body member and normally stationary with respect thereto, the other contact being movable transversely of the body member, a centering plate movably connected with the body member, said plate having an opening through which the movable contact passes, a spring means associated with the centering plate for urging it outwardly, a spring means associated with the movable contact for moving it outwardly, means for transmitting motion from the movable contact to the indicator and means for limiting the outward movement of the movable contact with respect to the centering plate whereby when the latter is moved inwardly it will carry with it the movable contact.

14. A device for measuring the diameter of a cylindrical opening comprising, in combination, a body member adapted to be inserted into the opening, a dial indicator secured to the body member, two aligned contacts for making engagement with the opening wall at diametrically opposed points, one of the contacts being stationary and the other movable with respect to the body member, means for transmitting motion from the movable contact to the indicator, means comprising a plate having parallel edges for locating the contacts with respect to the opening so that their common axis coincides with a diameter lying in a plane perpendicular to the axis of the opening and means for effecting a simultaneous inward movement of the locating plate and the movable contact.

15. A device for measuring the diameter of a cylindrical work piece comprising, in combination, a body member, a dial indicator secured to the body member, two aligned contacts for making engagement with the work piece at diametrically opposed points, one of the contacts being stationary and the other movable with respect to the body member, means for transmitting motion from the movable contact to the indicator, means comprising a plate having parallel edges for locating the contacts with respect to the work piece so that their common axis coincides with a diameter lying in a plane perpendicular to the axis of the work piece and means for effecting a simultaneous inward movement of the locating plate and the movable contact.

CLARENCE W. TYDEMAN.